(12) United States Patent
Fung

(10) Patent No.: US 11,684,464 B2
(45) Date of Patent: Jun. 27, 2023

(54) METHOD AND APPARATUS FOR FORMING A PROSTHETIC TOOTH ELEMENT

(71) Applicant: John Fung, Chatswood (AU)

(72) Inventor: John Fung, Chatswood (AU)

(73) Assignee: John Fung, Chatswood (AU)

( * ) Notice: Subject to any disclaimer, the term of this patent is extended or adjusted under 35 U.S.C. 154(b) by 1 day.

(21) Appl. No.: 16/979,843

(22) PCT Filed: Mar. 13, 2019

(86) PCT No.: PCT/AU2019/050226
§ 371 (c)(1),
(2) Date: Sep. 10, 2020

(87) PCT Pub. No.: WO2019/173872
PCT Pub. Date: Sep. 19, 2019

(65) Prior Publication Data
US 2021/0022837 A1    Jan. 28, 2021

(30) Foreign Application Priority Data

Mar. 16, 2018 (AU) ................................ 2018201914

(51) Int. Cl.
*A61C 13/08* (2006.01)
*A61C 13/083* (2006.01)
*A61C 13/20* (2006.01)

(52) U.S. Cl.
CPC .......... *A61C 13/082* (2013.01); *A61C 13/081* (2013.01); *A61C 13/083* (2013.01); *A61C 13/20* (2013.01)

(58) Field of Classification Search
CPC ... A61C 13/081; A61C 13/082; A61C 13/083; A61C 13/20
(Continued)

(56) References Cited

U.S. PATENT DOCUMENTS 2,474,676 A    6/1949   Kelly
6,488,503 B1  12/2002   Lichkus et al.
(Continued)

FOREIGN PATENT DOCUMENTS

CN    101547661 A    9/2009
CN    102573693      7/2021
(Continued)

OTHER PUBLICATIONS

International Search Report dated Apr. 4, 2019 in International Patent Application No. PCT/AU2019/050226 (5 pages, in English).
(Continued)

*Primary Examiner* — Matthew M Nelson
(74) *Attorney, Agent, or Firm* — Bookoff McAndrews, PLLC

(57) ABSTRACT

A method of forming a prosthetic tooth element (104) is disclosed, the method comprising depositing a first hardenable fluid material (101) at a bottom of a cavity (111) of a female mould (110) to a first level (113), the first material having a first translucency when hardened; depositing in the cavity (111), over the first material (101), a second hardenable fluid material (102) to a second level (114), the second material having a second translucency when hardened, the second translucency being less translucent than the first translucency; and inserting a male mould (120) into the cavity (111), the insertion of the male mould displacing at least a portion of the second material (102) within the cavity (111).

17 Claims, 4 Drawing Sheets

(58) Field of Classification Search
USPC ...................................................... 433/203.1
See application file for complete search history.

(56) References Cited

U.S. PATENT DOCUMENTS

| | | |
|---|---|---|
| 2012/0175801 A1 | 7/2012 | Jahns et al. |
| 2013/0168887 A1 | 7/2013 | Korten |
| 2014/0142736 A1 | 5/2014 | Taub et al. |
| 2016/0293056 A1 | 10/2016 | Kadobayashi et al. |
| 2017/0189146 A1 | 7/2017 | Volkl et al. |

FOREIGN PATENT DOCUMENTS

| | | | |
|---|---|---|---|
| FR | 998598 A | 1/1952 | |
| JP | 2016194625 A | 11/2016 | |
| WO | 2016011495 A1 | 1/2016 | |
| WO | WO-2016011495 A1 * | 1/2016 | ............... A61C 5/70 |
| WO | 2017114785 A1 | 7/2017 | |
| WO | 2017187103 A1 | 11/2017 | |

OTHER PUBLICATIONS

Written Opinion of the International Searching Authority dated Apr. 4, 2019 in International Patent Application No. PCT/AU2019/050226 (4 pages, in English).
International Search Report dated Sep. 26, 2019 in International Patent Application No. PCT/FR2019/050638 (5 pages, in French).
Written Opinion of the International Searching Authority dated Sep. 26, 2019 in International Patent Application No. PCT/FR2019/050638 (6 pages, in French).
Search Report issued in Chinese Application 2019800184612 dated Jul. 14, 2021 (3 pages).
Office Action issued in Japanese Application JP 2020-572582 dated Jan. 13, 2023 (5 pages).

* cited by examiner

METHOD AND APPARATUS FOR FORMING A PROSTHETIC TOOTH ELEMENT

CROSS-REFERENCE TO RELATED APPLICATIONS

This application claims the benefit of priority to International Patent Application No. PCT/AU2019/050226, filed on 16 Mar. 2019, which claims the benefit of Australian Patent Application No. 2018201914 filed on 16 Mar. 2018, the disclosure of the '914 application being incorporated herein by reference in its entirety.

TECHNICAL FIELD

The present disclosure relates to methods and apparatuses for preparing prosthetic tooth elements such as dental prostheses.

BACKGROUND

A prosthetic tooth element such as a dental prosthesis is an artificial tooth structure, which is designed to restore, replace, or replicate a tooth that has been partially or wholly lost, for example through decay or other damage. The prosthetic tooth element is secured to the patient's jaw, e.g., the lower jaw bone (mandible) or upper jaw bone (maxilla) via an anchoring fixture such as a mount or root that is at least partially implanted in the bone. The root may be an artificial root, or part of an old tooth.

It is important that a prosthetic tooth element conforms not only to the shape of any tooth that it is designed to replace, but to the shape of neighbouring teeth, the 'bite' of the patient's mouth, and the colouring and translucency of the patient's teeth.

A prosthetic tooth element is typically prepared by obtaining a precise model of a patient's teeth, e.g. a bottom or top row of teeth, the model being obtained by taking a mould using an impression material. The model may be scanned and an appropriate configuration for the dental prosthesis is determined. Subsequently, a body of solid dental ceramic, typically a block of zirconia material, is milled in accordance with the determined configuration to arrive at a cast, which can then be coloured as appropriate, and sintered/cured to yield a prosthetic tooth element. As an alternative approach, a prosthetic tooth element is prepared by manually sculpting and layering different dental materials over a plinth, building up an appropriate shape and colour and/or translucency profile through skilled craftsmanship.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to one aspect, the present disclosure provides a method of forming a prosthetic tooth element comprising:
depositing a first hardenable fluid material at a bottom of a cavity of a female mould to a first level, the first material having a first translucency when hardened;
depositing in the cavity, over the first material, a second hardenable fluid material to a second level, the second material having a second translucency when hardened, the second translucency being less translucent than the first translucency; and
inserting a male mould into the cavity, the insertion of the male mould displacing at least a portion of the second material within the cavity.

The male mould may be inserted to a depth where it projects at least below the second level. In some embodiments, the male mould may be inserted to a depth where it projects below both the first and second levels. The insertion may displace at least a portion of the first material in addition to the second material. The displacing may form a mixture of the first and second fluid materials. In some embodiments, while at least a portion of the second material, and optionally a portion of the first material, is displaced by the male mould, a portion of the first material may still be maintained at the bottom of the cavity.

The prosthetic tooth element formed by the method may have a translucency gradient. The translucency of the prosthetic tooth element at a first end, formed at the bottom of the female mould cavity, may be greater than the translucency of the prosthetic tooth element at an opposite end and/or inner region of the prosthetic tooth element. The translucency gradient may be a step gradient or a linear gradient. The translucency gradient may be caused by more of the first material being located towards the first end of the prosthetic tooth element than at the opposite end and/or inner region of the prosthetic tooth element, and by more of the second material being at the opposite end and/or inner region of the prosthetic tooth element than at the first end of the prosthetic tooth element.

In some embodiments, one or more additional materials, such as a third hardenable fluid material and/or a fourth hardenable material, etc., may be deposited in the cavity of the female mould, over or between the first and second materials, for example. The additional materials may also have different translucencies when hardened. The use of additional materials may provide for a smoother translucency gradient across the prosthetic tooth element. For example, in one embodiment, the method may comprise, prior to depositing of the second material, depositing a third hardenable fluid material in the cavity of the female mould over the first material, the third material having a third translucency when hardened, the third translucency being less translucent than the first translucency and more translucent than the second translucency. After the deposition of the second material, the third material may be located between the first and second materials. As another example, in one embodiment the method may comprise depositing a third hardenable fluid material in the cavity of the female mould over the second material, the third material having a third translucency when hardened, the third translucency being less translucent than both the first translucency and the second translucency.

The internal surface of the female mould cavity may be an impression of a dental surface. In some embodiments, this dental surface may correspond to an outer surface of a natural or artificial tooth. The male mould may have an external surface corresponding to the external surface of an anchoring fixture such as a mount or root that is at least partially implanted in the bone of a patient's jaw. The root may be an artificial root such as an implant post or abutment, or part of a natural tooth.

In one embodiment, the female mould is configured to permit excess first and/or second hardenable material to escape from the cavity during insertion of the male mould. Alternatively, the female mould may be configured to maintain the first and second hardenable materials entirely within the cavity during insertion of the male mould.

The method may further comprise the step of solidifying, at least partially, the first and second fluid materials within the female mould cavity to form a prosthetic tooth element cast. The solidifying of the first and second materials may be carried out by exposing the first and second materials (or mixture thereof) to atmospheric conditions for a period of time and/or by changing environmental conditions such as temperature.

The method may further comprise removing the prosthesis tooth element cast from the female and male moulds.

The method may further comprise curing the prosthesis tooth element cast, e.g., after removal of the cast from the female and male moulds, to form a prosthetic tooth element.

In a preferred embodiment, the first and/or second hardenable fluid material is a dental mixture including a ceramic powder and a binding agent. The ceramic powder may be one or more dental ceramic materials including, but not limited to, zirconia, zirconia-oxide, or aluminium oxide. The binding agent may be any adhesive typically used to bind ceramic powder together. For example, one or more waxes may be used including, but not limited to, natural waxes (paraffin, microcrystalline wax, barnsdahl wax, beeswax, carnauba wax, ceresin wax, cocoa butter, spermaceti wax), synthetic waxes (polyethylene polymers, polyoxyethylene polymers), gums, fats (fatty acids, oils, esters), natural or synthetic resins (dammar, kauri, rosin, polystyrene, dimethacrylate monomers).

The first and/or second hardenable fluid material may additionally comprise optical modifiers and pigments to adjust the colour and/or the translucency of the material. Further, the first and/or second hardenable fluid material may include filler particles, e.g. to adjust the strength or viscosity of the material. For example, the hardenable fluid material may include metal oxide particles (titanium oxide or aluminium oxide), silica or quartz.

In one embodiment, the first and/or second hardenable fluid material may be light-curable and may comprise a light-activated material that sets when exposed to light. The method may comprise curing the prosthetic tooth element cast by exposing the cast to light. In another embodiment, the first and/or second hardenable fluid material may be heat-curable and the method may comprise curing the prosthetic tooth element cast by firing, for example in a furnace. A hardenable material offering chemically-activated materials, or a combination of one or more of light, heat and chemically-activated materials, may also be used.

In one aspect of the present disclosure there is provided a prosthetic tooth element cast formed by a method according to a preceding aspect. In one aspect of the present disclosure there is provided a prosthetic tooth element formed by a method according to a preceding aspect.

The present disclosure may present a relatively straightforward and effective method to form a prosthetic tooth element with a desired shape and translucency, reducing or eliminating any need for formation of the prosthetic tooth element manually, e.g. by a skilled craftsman. Moreover, the technique may be industrially applied, enabling multiple prosthetic tooth elements to be formed at once, e.g. using a single apparatus.

According to one aspect of the present disclosure, there is provided an apparatus for forming one or more prosthetic tooth elements using one or more female moulds and one or more male moulds, the apparatus comprising:

one or more fluid deposition devices to deposit a first hardenable fluid material at a bottom of a cavity of each of the one or more female moulds, and deposit a second hardenable fluid material in the cavity over the first material, and an insertion mechanism configured to insert a male mould into each cavity to displace at least a portion of the second material within the cavity.

The apparatus may be used to implement the method of forming a prosthetic tooth element according to a preceding aspect, e.g. on an industrial or commercial scale.

In one embodiment, the apparatus for forming a prosthetic tooth element may be configured to deposit the first material into cavities of a plurality of the female moulds concurrently and/or adapted to deposit the second material into the cavities of a the plurality of the female moulds concurrently or in quick succession.

In one embodiment, the insertion mechanism of the apparatus may be adapted to insert the one or more male moulds into the cavities of a plurality of female moulds concurrently or in quick succession. A method of forming multiple prosthetic tooth elements substantially at the same time may therefore be provided.

The apparatus may be adapted to deposit one or more additional hardenable fluid materials in the cavity of the female mould, e.g., third or further hardenable fluid materials.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

By way of example only, embodiments are now described with reference to the accompanying drawings, in which.

DETAILED DESCRIPTION OF EXEMPLARY EMBODIMENTS

Apparatuses and methods for forming a prosthetic tooth element according to embodiments of the present disclosure are now described.

Figure 1:
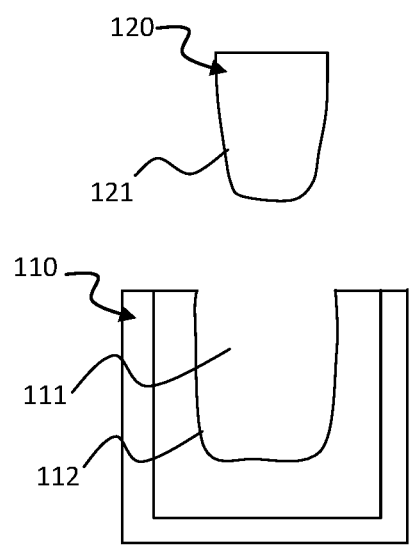
FIG. 1 shows a cross-sectional view of apparatus according to an embodiment of the present disclosure.

In one embodiment, as illustrated in FIG. 1, apparatus is provided that includes a female mould 110 and a male mould 120.

The female mould 110 has a cavity 111 defined by an internal surface 112. The internal surface 112 can be an impression of, and/or correspond to the shape of, a dental surface. The internal surface 112 can be such that a prosthetic tooth element 104 that is formed by moulding within the cavity 111 of the female mould 110 will be formed with an outer surface 1044 (see e.g., FIG. 3) that has a shape corresponding to the shape of the dental surface. The dental surface may be an outer surface of a tooth, for example.

The male mould 120 includes an external surface 121. The male mould 120 is shaped and proportioned so that it can fit within the cavity 111 of the female mould 110 while leaving a space between its external surface 121 and the internal surface 112 of the female mould 110. The external surface 121 of the male mould 120 can have a shape corresponding to the shape of an anchoring fixture such as a mount or root that is at least partially implanted in bone of a patient's jaw. The root may be an artificial root such as an implant post or abutment, or part of a natural tooth. The external surface 121 can be such that a prosthetic tooth element 104 that is formed by moulding within the gap between the male mould 120 and the female mould 110 will be formed with an inner surface 1045 (see e.g., FIG. 3) that corresponds to the shape of the anchoring fixture, enabling close-fit mounting of the prosthetic tooth element on the anchoring fixture, for example.

A method according to an embodiment of the present disclosure, which uses the female and male moulds 110, 120, is now described with reference to FIGS. 2a to 2c and FIG. 4.

Figure 2A:
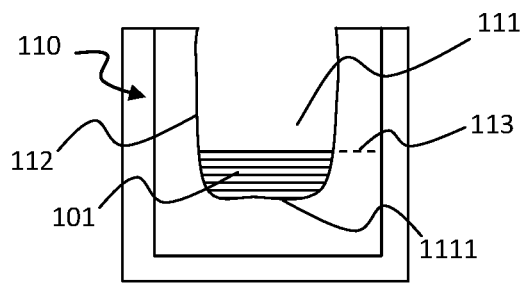
FIGS. 2a to 2c illustrate steps carried out in a method of forming a prosthetic tooth element, using the apparatus of FIG. 1, according to an embodiment of the present disclosure.
Figure 4:
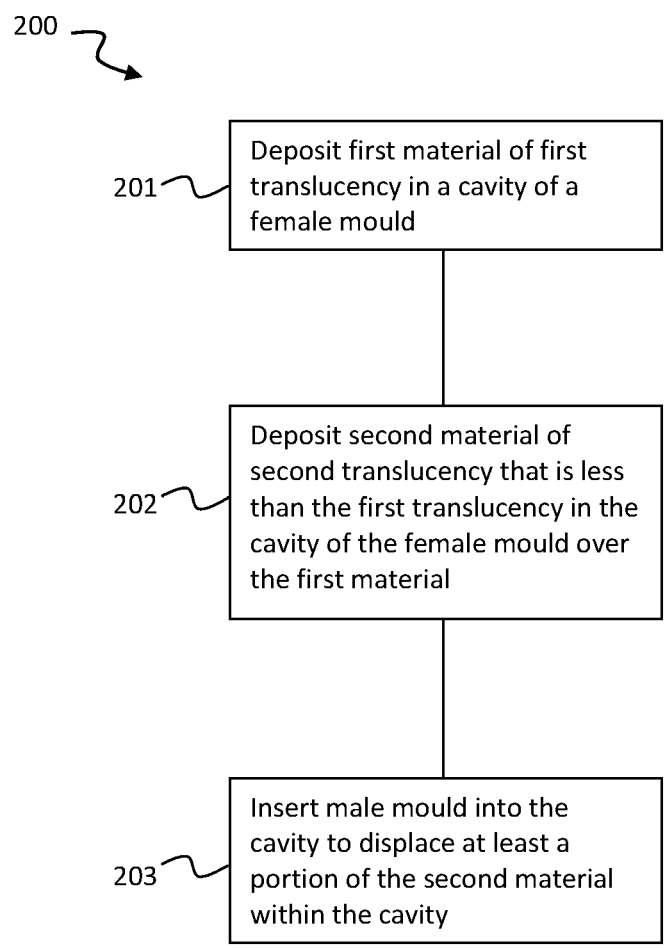
FIG. 4 shows a flow-chart of steps carried out in a method of forming a prosthetic tooth element according to an embodiment of the present disclosure.

With reference to FIG. 2a and item 201 of the flowchart 200 of FIG. 4, a first hardenable fluid material 101 is deposited at the bottom of the cavity 111 of the female mould 110. The first material 101 fills to a first level 113 within the cavity 111. The first material 101 is configured to have a first translucency when hardened. The first material 101 is represented by horizontal lines in FIG. 2a.

Figure 2B:
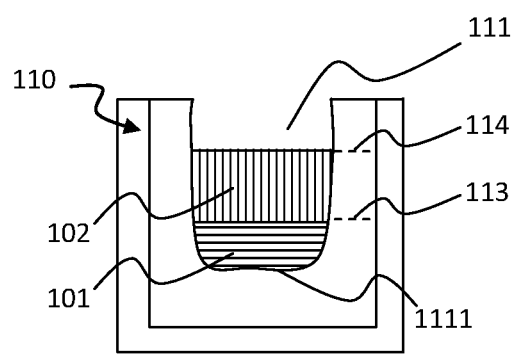

With reference to FIG. 2b and item 202 of the flowchart 200 of FIG. 4, a second hardenable fluid material 102 is deposited in the cavity over the first material 101. The second material fills to a second level 114 within the cavity 111, above the first level 113. The second material 102 is configured to have a second translucency when hardened, the second translucency being less translucent than the first translucency. The second material 102 is represented by vertical lines in FIG. 2b.

Figure 2C:
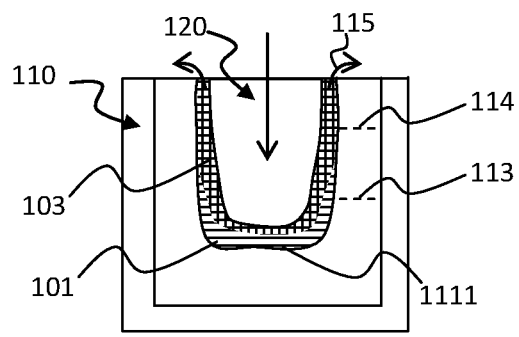

With reference to FIG. 2c and item 203 of the flowchart 200 of FIG. 4, the male mould 120 is inserted into the cavity 111 that has the first and second materials 101, 102 deposited therein. The insertion of the male mould 120 causes displacement of at least a portion of the second material 102 within the cavity. In this regard, the male mould 120 is inserted to a depth where it projects at least below the second level 114. Nevertheless, as represented in FIG. 2c, the male mould 120 can be inserted to a depth where it projects below both the first and second levels 113, 114, in which case at least a portion of the first material 101 is displaced by the insertion of the male mould, in addition to the displacement of the second material 102.

The displacing may form a mixture 103 of portions of the first and second materials 101, 102. A mixture 103 of the first and second materials 101, 102 is represented by crossed horizontal and vertical lines in FIG. 2c. Alternatively, however, the first and second materials 101, 102 may not mix. Regardless, the approach can be such that, at the bottom of the cavity, only the first material 101 is retained, or a mixture of the first and second materials 101, 102 is retained that has a relatively high proportion of the first material 101.

Figure 3:
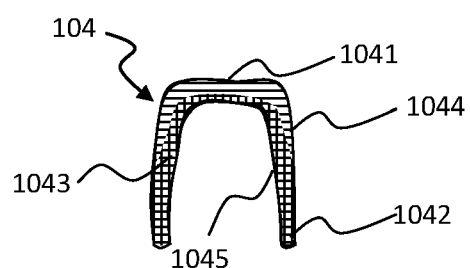
FIG. 3 shows a cross-sectional view of a prosthetic tooth element formed in a method according to an embodiment of the present disclosure.

The distribution of the first and second materials may be substantially retained within the prosthetic tooth element 104 that is ultimately formed. Thus, as illustrated in FIG. 3, the prosthetic tooth element 104 may have a translucency at a first end 1041 that was formed at the bottom 1111 of the female mould cavity 111 that is greater than its translucency at an opposite end 1042 and/or inner region 1043. This translucency gradient may be a step gradient or a linear gradient. The translucency gradient is caused by more of the (more translucent) first material being located towards the first end 1041 of the prosthetic tooth element 104 than at the opposite end 1042 and/or inner region 1043 of the prosthetic tooth element 104, and by more of the (less translucent) second material being at the opposite end 1042 and/or inner region 1043 of the prosthetic tooth element than at the first end 1041 of the prosthetic tooth element 104.

To form the prosthetic tooth element 104, the method may further comprise solidifying, at least partially, the first and second fluid materials 101, 102 (or mixture 103) within the female mould cavity to form a prosthetic tooth element cast. Depending on the chemical make-up of the first and second materials, the solidifying of the first and second materials may be carried out by simply maintaining the first and second materials under atmospheric conditions for an extended period of time and/or by changing environmental conditions such as temperature. Once at least partially solidified, the cast may be removed from the female and male moulds 110, 120 and the cast may be subjected to a curing process to form a fully-hardened prosthetic tooth element 104.

The hardenable fluid materials 101, 102 may be light-curable and may comprise a light-activated material that sets when exposed to light. The method can therefore include curing the prosthetic tooth element cast by exposing the cast to light. In another embodiment, however, the hardenable fluid material may be heat-curable and the method may comprise curing the prosthetic tooth element cast by firing, for example in a furnace. A hardenable material offering chemically-activated materials, or a combination (light, heat and chemically-activated materials) may also be used.

In one embodiment, the mould is configured to permit excess first and/or second material 101, 102 to escape from the cavity 111 during insertion of the male mould 120, as represented by arrows 115 in FIG. 2c. Alternatively, however, the moulds 110, 120 and/or first and second fluid levels 113, 114 may be selected so that the first and second materials 101, 102 can be maintained entirely within the cavity 111 during insertion of the male mould 120.

The first and/or second material 101, 102 may be a dental mixture including a ceramic powder and a binding agent. The ceramic powder may be one or more dental ceramic materials including, but not limited to, zirconia, zirconia-oxide, or aluminium oxide. The binding agent may be any adhesive typically used to bind ceramic powder together. For example, one or more waxes may be used including, but not limited to, natural waxes (paraffin, microcrystalline wax, barnsdahl wax, beeswax, carnauba wax, ceresin wax, cocoa butter, spermaceti wax), synthetic waxes (polyethylene polymers, polyoxyethylene polymers), gums, fats (fatty acids, oils, esters), natural or synthetic resins (dammar, kauri, rosin, polystyrene, dimethacrylate monomers).

The first and/or second material 101, 102 may additionally comprise optical modifiers and pigments to adjust the colour and/or the translucency of the fluid material. Further, the first and/or second material 101, 102 may include filler particles, e.g. to adjust the strength or viscosity of the material. For example, the first and/or second material 101, 102 may include metal oxide particles (titanium oxide or aluminium oxide), silica or quartz. The first and/or second material 101, 102 may be a liquid or paste and may have Newtonian or non-Newtonian properties.

Although only first and second hardenable fluid materials 101, 102 are described above, in practice three of more hardenable fluid materials may be used, deposited one on top of the other in a manner that, following insertion of the male mould, achieves the desired translucency gradient across the prosthetic tooth element. The use of additional materials may provide for a smoother translucency gradient across the prosthetic tooth element, for example.

The method described above may present a relatively straightforward and effective method to form a prosthetic tooth element with a desired shape and translucency, reducing or eliminating any need for formation of the prosthetic tooth element manually, e.g. by a skilled craftsman. Moreover, the technique may be industrially applied, enabling multiple prosthetic tooth elements to be formed substantially at the same time, e.g. using a single apparatus.

In more detail, as now described with reference to FIGS. 5 and 6, in one embodiment an apparatus 300 for forming one or more prosthetic tooth elements using one or more female moulds 310 and one or more male moulds 320 is provided. The apparatus 300 includes one or more fluid deposition devices 330 to deposit a first hardenable fluid material 301 at a bottom of a cavity 311 of a respective female mould 310, and deposit a second hardenable fluid material 302 in the cavity 311 over the first material 301. The apparatus 300 also includes an insertion mechanism 340 configured to insert one or more male moulds 320 into the cavities 311 of the one or more female moulds 310.

Figure 5:
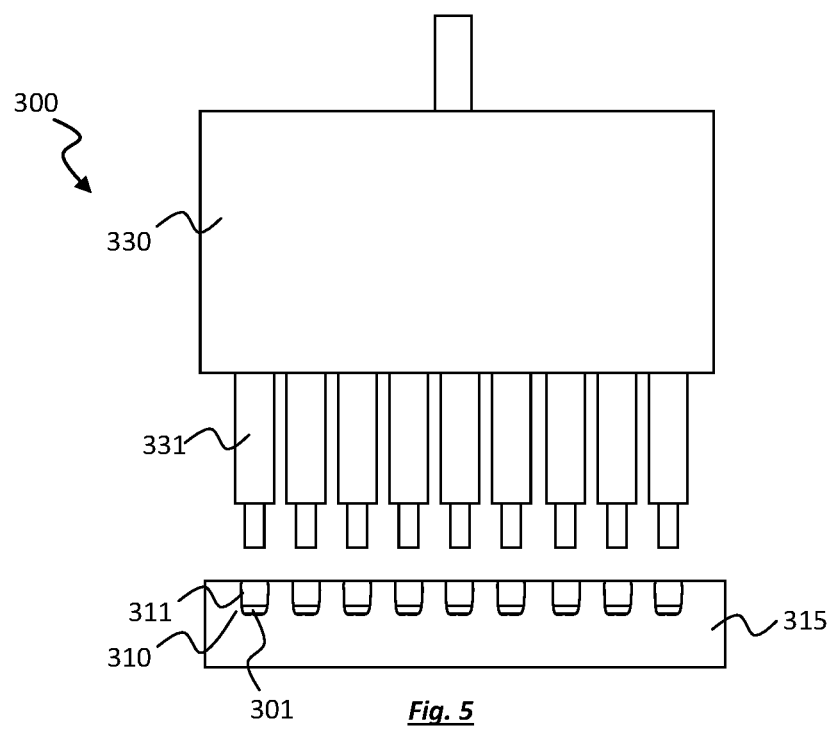
FIG. 5 shows a cross-sectional view of apparatus according to an embodiment of the present disclosure.

As shown in FIG. 5, the one or more fluid deposition devices 330 are provided by an autopipette that includes multiple nozzles 331 for depositing the materials 301, 302 in the cavities 311. Moreover, multiple female moulds 310 with respective cavities 310 are formed within a single solid block of material 315. The same autopipette can be configured to deposit both the first and second materials 301, 302, in a sequential manner. Alternatively a different autopipette (or indeed entirely different types of fluid deposition devices) can be used to deposit the second material 302 after the deposition of the first material 301.

Figure 6:
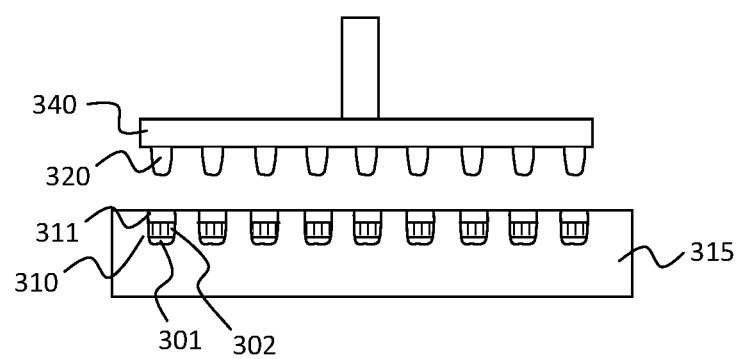
FIG. 6 shows a cross-sectional view of apparatus according to an embodiment of the present disclosure.

As shown in FIG. 6, the insertion mechanism 340 includes multiple male moulds 320 that are arranged to be inserted substantially at the same time within the cavities 311. The male moulds 320 are connected together and moved into the cavities 311 using an actuation mechanism such as a linear actuator, robotic arm or otherwise.

Using the apparatus 300, the first material 301 may be deposited into all cavities 311 of the female moulds 310 concurrently or in quick succession and then the second material 302 may be deposited into all cavities 311 of the female moulds 320 concurrently or in quick succession. Moreover, the insertion mechanism 340 may be adapted to insert the male moulds 320 into the cavities 311 concurrently or in quick succession. The approach may enable multiple prosthetic tooth elements to be formed substantially at the same time.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of forming a prosthetic tooth element comprising:

depositing a first hardenable fluid material at a bottom of a cavity of a female mould to a first level, the first hardenable fluid material having a first translucency when hardened;

depositing in the cavity, over the first hardenable fluid material, a second hardenable fluid material to a second level, the second hardenable fluid material having a second translucency when hardened, the second translucency being less translucent than the first translucency, wherein the deposition of the second hardenable fluid material in the cavity occurs before insertion of any male mould into the cavity that causes any displacement of the first hardenable fluid material; and inserting a male mould into the cavity when the first hardenable fluid material and the second hardenable fluid material are fluid, the insertion of the male mould displacing at least a portion of the second hardenable fluid material within the cavity.

2. The method of claim 1, wherein the male mould is inserted to a depth where it projects at least below the second level.

3. The method of claim 1, wherein the male mould is inserted to a depth where it projects below both the first and second levels.

4. The method of claim 1, wherein the prosthetic tooth element formed by the method has a translucency gradient, the translucency of the prosthetic tooth element at a first end formed at the bottom of the female mould cavity being greater than the translucency of the prosthetic tooth element at an opposite end and/or inner region of the prosthetic tooth element.

5. The method of claim 1, wherein the method comprises solidifying, at least partially, the first and second hardenable fluid materials within the cavity to form a prosthetic tooth element cast.

6. The method of claim 5, wherein solidifying the first and second hardenable fluid materials comprises exposing the first and second hardenable fluid materials to a change in temperature.

7. The method of claim 5, wherein the method comprises removing the prosthetic tooth element cast from the female and male moulds.

8. The method of claim 7, comprising curing the prosthetic tooth element cast to form a prosthetic tooth element.

9. The method of claim 8, wherein the first and/or second hardenable fluid material is light-curable, and the method comprises curing the prosthetic tooth element cast by exposing the cast to light.

10. The method of claim 8, wherein the first and/or second hardenable fluid material is heat-curable, and the method comprises curing the prosthetic tooth element cast by firing the cast in a furnace.

11. The method of claim 1, wherein the first and/or second hardenable fluid material is a dental mixture comprising a ceramic powder and a binder agent.

12. The method of claim 11, wherein the ceramic comprises at least one of zirconia, zirconia-oxide and aluminium oxide.

13. The method of claim 11, wherein the binder agent is an adhesive to bind the ceramic powder together.

14. The method of claim 1, wherein an internal surface of the female mould cavity is an impression of a dental surface.

15. The method of claim 1, comprising, prior to depositing of the second hardenable fluid material, depositing a third hardenable fluid material in the cavity of the female mould over the first hardenable fluid material, the third hardenable fluid material having a third translucency when hardened, the third translucency being less translucent than the first translucency and more translucent than the second translucency.

16. The method of claim 1, comprising depositing a third hardenable fluid material in the cavity of the female mould over the second hardenable fluid material, the third hardenable fluid material having a third translucency when hardened, the third translucency being less translucent than both the first translucency and the second translucency.

17. A prosthetic tooth element formed by the method of claim 1.

* * * * *

UNITED STATES PATENT AND TRADEMARK OFFICE
CERTIFICATE OF CORRECTION

| | |
|---|---|
| PATENT NO. | : 11,684,464 B2 |
| APPLICATION NO. | : 16/979843 |
| DATED | : June 27, 2023 |
| INVENTOR(S) | : John Fung |

It is certified that error appears in the above-identified patent and that said Letters Patent is hereby corrected as shown below:

In the Specification

In Column 1, Line 9, delete "16 Mar. 2019" and insert --13 Mar. 2019,--.

Signed and Sealed this
Eighth Day of August, 2023

Katherine Kelly Vidal
*Director of the United States Patent and Trademark Office*